US007333975B2

(12) United States Patent
Cain

(10) Patent No.: US 7,333,975 B2
(45) Date of Patent: Feb. 19, 2008

(54) INFORMATION SYSTEM AND METHOD FOR DISSEMINATING TECHNOLOGY INFORMATION

(76) Inventor: John Robert Cain, 22006 York Mills Cir., Novi, MI (US) 48374

( * ) Notice: Subject to any disclaimer, the term of this patent is extended or adjusted under 35 U.S.C. 154(b) by 299 days.

(21) Appl. No.: 10/373,218

(22) Filed: Feb. 24, 2003

(65) Prior Publication Data

US 2003/0163463 A1   Aug. 28, 2003

Related U.S. Application Data

(60) Provisional application No. 60/359,344, filed on Feb. 25, 2002.

(51) Int. Cl.
*G06F 17/30* (2006.01)
(52) U.S. Cl. .............................. 707/3; 707/6; 709/217
(58) Field of Classification Search ............. 707/1–10, 707/100–104.1, 200–206; 709/217–219, 709/225, 229, 206
See application file for complete search history.

(56) References Cited

U.S. PATENT DOCUMENTS

| 5,630,125 A | 5/1997 | Zellweger ............... 707/103 R |
| 5,675,784 A | 10/1997 | Maxwell et al. ............ 707/100 |
| 5,740,425 A | 4/1998 | Povilus ...................... 707/100 |
| 5,806,069 A | 9/1998 | Wakiyama et al. ......... 707/102 |
| 5,832,496 A | 11/1998 | Anand et al. ............... 707/102 |
| 5,870,746 A | 2/1999 | Knutson et al. ............ 707/101 |
| 5,890,175 A | 3/1999 | Wong et al. ................ 715/505 |
| 5,897,622 A | 4/1999 | Blinn et al. .................. 705/26 |
| 5,907,837 A | 5/1999 | Ferrel et al. ................... 707/3 |
| 5,913,202 A | 6/1999 | Motoyama ................ 705/36 R |
| 5,913,210 A | 6/1999 | Call .............................. 707/4 |
| 5,974,418 A | 10/1999 | Blinn et al. ................. 707/100 |
| 6,032,145 A | 2/2000 | Beall et al. ..................... 707/5 |
| 6,055,515 A | 4/2000 | Consentino et al. .......... 705/27 |
| 6,055,538 A | 4/2000 | Kessenich et al. .......... 707/101 |
| 6,076,091 A | 6/2000 | Fohn et al. ................. 707/102 |
| 6,078,922 A | 6/2000 | Johnson et al. ............. 707/100 |

(Continued)

OTHER PUBLICATIONS

Esther K. Lee et al., An Enterprise Intelligence System Integrating WWW & Intranet Resource, 1999, IEEE, 28-35.*

(Continued)

*Primary Examiner*—Jean Bolte Fleurantin
(74) *Attorney, Agent, or Firm*—Dickinson Wright PLLC

(57) ABSTRACT

An informational system for disseminating technology information between requestors and purveyors as well as a method for using the system for this purpose. The informational system generally includes requestor and purveyor servers as well as a host system having a data structure, a search engine communicating with the data structure, and an application server communicating with the data structure and search engine. The data structure includes a plurality of data arrays for storing, among other information, a plurality of data entries each with technology and purveyor data as well as requestor data including requestor registered external informational sources. The application server is configured to receive a search request having a technology parametric from a requestor, to cause the search engine to conduct a search in one of the data arrays, and communicate a search report to the requestor. The application server optionally includes a number of search modules for identifying suitable available technology as well as accessing external informational sources for further exploring the suitability of technology for the requestor's application or industry.

7 Claims, 6 Drawing Sheets

U.S. PATENT DOCUMENTS

| | | | |
|---|---|---|---|
| 6,122,648 A | 9/2000 | Roderick | 715/513 |
| 6,128,600 A | 10/2000 | Imamura et al. | 705/27 |
| 6,134,548 A | 10/2000 | Gottsman et al. | 707/5 |
| 6,154,738 A | 11/2000 | Call | 707/4 |
| 6,182,065 B1* | 1/2001 | Yeomans | 707/3 |
| 6,199,099 B1 | 3/2001 | Gershman et al. | 709/203 |
| 6,202,062 B1 | 3/2001 | Cameron et al. | 707/3 |
| 6,220,743 B1 | 4/2001 | Campestre et al. | 700/97 |
| 6,249,714 B1 | 6/2001 | Hocaoglu et al. | 700/97 |
| 6,260,046 B1 | 7/2001 | Lukaszewski et al. | 707/103 R |
| 6,263,322 B1 | 7/2001 | Kirkevold et al. | 705/450 |
| 6,263,341 B1 | 7/2001 | Smiley | 707/103 R |
| 6,301,584 B1 | 10/2001 | Ranger | 707/103 R |
| 6,321,224 B1 | 11/2001 | Beall et al. | 707/5 |
| 6,324,534 B1 | 11/2001 | Neal et al. | 707/3 |
| 6,341,287 B1 | 1/2002 | Sziklai et al. | 707/102 |
| 6,393,423 B1* | 5/2002 | Goedken | 707/10 |
| 6,397,221 B1 | 5/2002 | Greef et al. | 707/102 |
| 6,418,441 B1 | 7/2002 | Call | 707/10 |
| 6,697,808 B1* | 2/2004 | Hurwood et al. | 707/10 |
| 6,766,313 B1* | 7/2004 | Kromann | 707/2 |
| 6,883,003 B2* | 4/2005 | Nagahara | 707/10 |
| 2001/0013030 A1 | 8/2001 | Colby et al. | |
| 2001/0025304 A1 | 9/2001 | Keith, Jr. | |
| 2001/0037341 A1 | 11/2001 | Kimoto et al. | |
| 2002/0002560 A1 | 1/2002 | Shah et al. | |
| 2002/0016793 A1* | 2/2002 | Keith, Jr. | 707/201 |
| 2002/0016794 A1 | 2/2002 | Keith, Jr. | |
| 2002/0023085 A1* | 2/2002 | Keith, Jr. | 707/5 |
| 2002/0026440 A1 | 2/2002 | Nair | |
| 2002/0069175 A1 | 6/2002 | Burich | |
| 2002/0077997 A1 | 6/2002 | Colby et al. | |
| 2002/0087522 A1 | 7/2002 | MacGregor et al. | |
| 2002/0087576 A1 | 7/2002 | Geiger et al. | |
| 2003/0055888 A1* | 3/2003 | Matsumoto et al. | 709/203 |

OTHER PUBLICATIONS

Roy Goldma et al., WSQ/DSQ: A Practical Approach for Combined Querying of Databases & the Web, 2000, ACM, 285-296.*

International Search Report dated May 13, 2003 for International Application No. PCT/US03/05747, International filing date: Feb. 24, 2003, entitled "Information System And Method For Disseminating Technology Information" to John Robert Cain.

Selected pages from GlobalSpec.com web site dated Mar. 12, 2003 (10 pages).

Selected pages from e-in-SITE web site dated Mar. 12, 2003 (3 pages).

* cited by examiner

INFORMATION SYSTEM AND METHOD FOR DISSEMINATING TECHNOLOGY INFORMATION

CROSS-REFERENCE TO RELATED APPLICATION

This application claims the benefit of U.S. Provisional Application No. 60/359,344, filed Feb. 25, 2002, the entire disclosure of the application is considered part of the disclosure of this application and is hereby incorporated by reference.

BACKGROUND OF THE INVENTION

The present invention relates to a system and method for disseminating information between requestors and purveyors of technology related products and/or services and, more particularly, a system and method for assembling, storing, and disseminating technology information pertaining to one or more industries.

Presently, in many technology industries, manufacturers and suppliers rely on numerous, highly specialized consulting services and trade journals, interpersonal meetings/email/phone conversations, multiple link web searches and, quite often, coincidental relationships to gather and exchange industry information regarding production data, marketing data, available technology, and customer needs. These methods of gathering and exchanging information are time consuming, expensive, and often provide incomplete or deficient results. Accordingly, there is a need for a system and method for assembling, storing and disseminating technology information (pertaining to products and/or services) which overcomes the shortcomings of the prior art.

SUMMARY OF THE INVENTION

The present invention addresses the above and other needs in the art through an information system and method that assembles and stores available information in an integrated data structure. The information system and method permits the efficient dissemination of technology information between requestors, those seeking information, and purveyors, those seeking to disseminate technology information relating to purveyor offered technology products or services. In certain embodiments, the system and method permits users to focus the information toward specific industries as well as customization for individual requestors. These and the other features of the invention provide a system and method that more effectively disseminates technology information to users.

In view of the above, the present invention is directed to an informational system for disseminating technology information between requestors and purveyors as well as a method for using the system for this purpose. The informational system generally includes requestor and purveyor servers as well as a host system having a data structure, a search engine communicating with the data structure, and an application server communicating with the data structure and search engine. The data structure includes a plurality of data arrays for storing, among other information, a plurality of data entries each with technology and purveyor data as well as requester data including requestor registered external informational sources. The application server is configured to receive a search request having a technology parametric from a requester, to cause the search engine to conduct a search in one of the data arrays, and communicate a search report to the requester. The application server optionally includes a number of search modules for identifying suitable available technology as well as accessing external informational sources for further exploring the suitability of technology for the requestor's application or industry.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
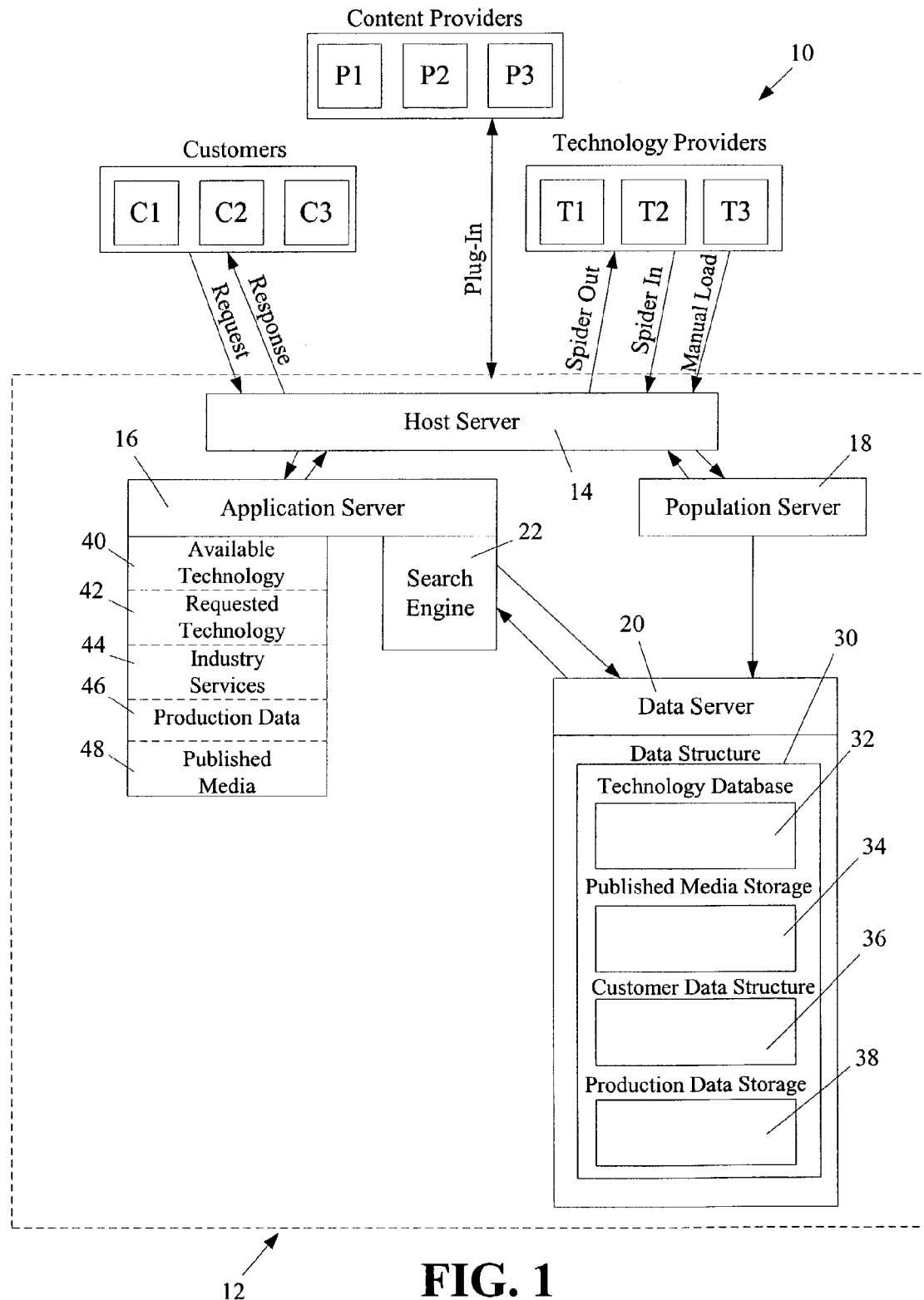
FIG. 1 is a schematic illustration of an information system in accordance with the present invention.

FIG. 1 schematically illustrates the information system 10 of the present invention. The information system 10 includes a host system 12 connected, or connectable, to a plurality of remote requestors, via customer servers C1-C3, and to a plurality of purveyors, such as content providers via content provider servers P1-P3 and/or technology providers via servers T1-T3. While the term "servers" is used throughout this application to permit communication between and among customers, purveyors, and the host system, this term is intended to encompass any suitable communication device permitting an electronic exchange of information including browsers for personal computers and the like. The host system 12 is shown in FIG. 1 to include a host server 14 for communicating with the customer, an application server 16 for selectively executing applications, a population server 18 configured to obtain technology information from the content and technology provider sources, and a data server 20. The data server 20 includes a data structure 30 with one or more data arrays referred to herein as a technology database 32, customer data structure 34, published media storage 36, and production data storage 38. While the data structure 30 is illustrated as having separate storage areas for technology, published media, customer information, and production data it should be appreciated that any number of conventional storage and communication techniques may be used without departing from the scope of the invention defined by the appended claims. For example, a single database storing data for all of the application modules may be used.

The data server 20 stores information and communicates with the application server 16, population server 18, and a search engine 22. The data server obtains, integrates and configures technology, customer, requestor, and/or purveyor information in a searchable source, e.g., data structure 30, and permits the assembly and reporting of information in a usable format. Those skilled in the art will appreciate that the components of the host system 12 illustrated in FIG. 1 are provided for illustrative purposes and that numerous conventional information exchange techniques and system configurations may be used with the present invention. For example, while the host system 12 is illustrated to include separate host, application, population, and data servers, as well as a search engine, a single server may be configured to provide the operations of all of the individually illustrated servers. It is contemplated that the operational characteristics and the "configuration" of the host server will be accommodated through software that is interfaceable and executable with the respective components of the host system as well as web platform query languages and server platforms to permit plug-in access or linking to the external informational sources described herein, data structure population techniques such as extraction and manual input, conventional searching strategies, and communication with request and/or purveyor servers.

Figure 2:
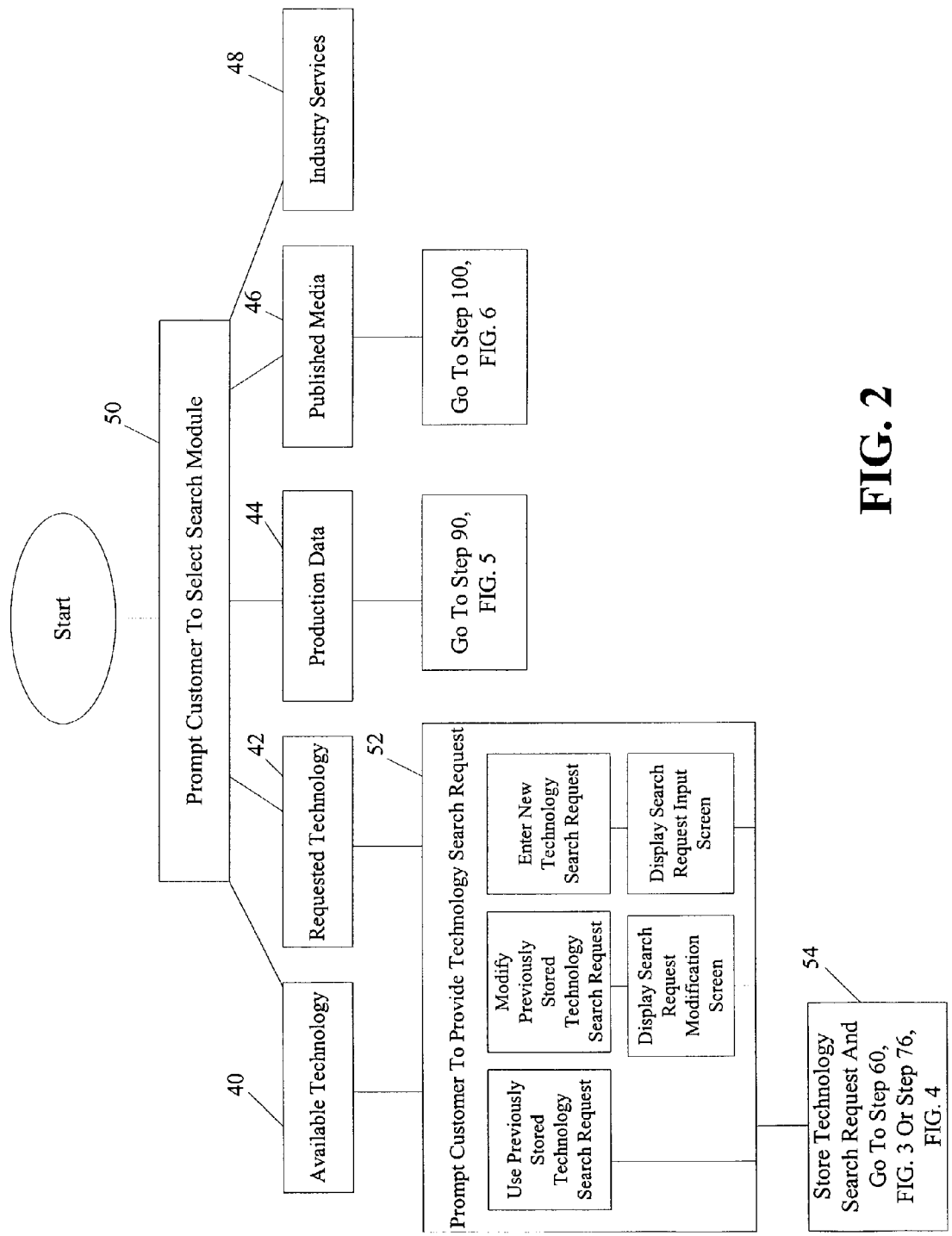
FIG. 2 is a flow chart illustrating the application modules of the present invention and representative steps for a requestor to submit a Technology Search Request.

In order to facilitate the description of the present invention, the embodiment of the information system 10 of the present invention shown in FIG. 2 includes five (5) information modules integrated or communicating with the application server 16—Available Technology 40, Requested Technology 42, Industry Services 44, Production Data 46, and Published Media 48. Either alone or in combination, the application modules, in conjunction with the integrated data server 20, permit a rapid and organized exchange of information between interested parties which is critical for making business decisions. For example, in the described embodiment, the host system 12 is configured to provide a requestor with technology information concerning products, services, production data, and published media (either generally or for a particular industry) which may be tailored or customized for the requestors, such as by source, industry, and/or market. By way of example rather than limitation, the system and method of the present invention are described herein in the context of technology information pertaining to the automotive electronics industry. However, the present invention can be used to effectively assemble, store, and disseminate information regarding any industry.

Some of the application modules (e.g., Available Technology, Requested Technology, and Industry Services) are configured to receive search requests, search the information stored in the data structure, and report relevant information to the requestor. One particularly useful and unique feature of the information system and method of the invention is the provision of requestor accessible external informational sources in addition to the reporting of technology information stored in the data structure 30. This feature, embodied in the Requested Technology, Industry Services, Published Media, and Production Data Modules, permits the requestor to access relevant information not stored in the data structure as well as inform purveyors in relevant technology areas of the requestor's interest and/or need for a specific technology.

Before turning to a detailed discussion of the operation of the individual application modules, it is noted that the host system 12 is configured to populate the data structure 30 with technology information from a variety of sources. As generally noted above, the data server 20, and/or the illustrated linked servers, allows technology information from a variety of sources to be loaded into the data structure 30 and updated by any number of techniques. The content providers P1-P3 and technology providers T1-T3 are illustrative examples of such sources. The present invention specifically contemplates population of the data structure 30 through web-based extraction, communication with an organization or purveyor maintaining a dedicated server for data structure population, or through system users having password protected account access to the data structure. The web-based extraction is represented by the "spider out" and "spider in" arrows in FIG. 1 whereby the population and host servers 18 and 14 operate in a conventional manner to retrieve technology information from the provider sources (such as data sheets on provider websites) and load the information in a predetermined parametrically searchable format. System user loading is represented by the "manual load arrow" shown in FIG. 1. The information may also be loaded from CD-ROMS or other media containing the necessary technology information. If the purveyor's website contains current technology information with appropriate parametrics, web-based data extraction is a preferred method as it will likely be the most effective means for loading and updating the product data. For completeness, it is noted that notwithstanding the described population techniques, those skilled in the art will appreciate that a variety of alternative data structure populating techniques generally known in the art may be used.

The data structure 30 is illustrated and described herein as including separate databases or data arrays specifically configured for each of the application modules. Notwithstanding this illustrative example, those skilled in the art will appreciate that a variety of data structures may be used without departing from the scope of the invention. The content of the data structure 30, or the individual data sources illustrated in the drawings, generally includes a technology database 32 for storing data entries for the Available Technology, Requested Technology, and/or Industry Services Modules. Each of the data entries are stored in searchable fields and contain a variety of information pertinent to commonly used criteria for selecting appropriate technology for an application or industry. For example, the technology database preferably includes technology and purveyor data as well as other optionally included data described below with reference to each of the modules. The Published Media Storage data array 34 and Production Data Storage array 38 may include a searchable data array for module operation in a manner similar to Available and Requested Technology searches. These data arrays may also include a library of available external informational sources accessible by the host system such as through conventional plug-in or linking technology. Finally, the customer data structure 36 is represented in the drawing to identify storage of requestor or purveyor specific information. For example, the customer data structure may include requestor or purveyor identification information (e.g., user identification or password) as well as the external informational sources for which each user has registered. Again, notwithstanding the separate illustration of these data arrays and the recited representative content of each, it will be appreciated that the data structure 30 may be configured in a number of ways suitable for use in the present invention.

Turning now to the application modules 40-48, an overview of the function of each module is followed by a detailed description of their respective operation and integration into the overall system and method. The Available Technology Module 40 (FIG. 3) is configured to receive a Technology Search Request from a requestor, cause the search engine 22 to perform a search of the data structure 30 for data entries matching the search request, and communicate an Available Technology Report containing information regarding the availability of technology matching the request to the requester. While the form and substance of the report may vary, this module generally permits the requestor to identify technology that may be pertinent to evaluating the availability of suitable technology for a particular application or industry. For example, in the described embodiment, the Available Technology Report includes information on the status or availability of the requested technology, the qualification status of the technology with respect to industry requirements, as well as information regarding the purveyor such as contact information and/or a website-email link.

The Requested Technology Module 42 (FIG. 4) facilitates the identification of an appropriate purveyor(s) of publicly unavailable or generally unknown technology and permits the requestor to submit inquiries to purveyors identified by the host system as having products, services, industry experience, and the like that closely match the technology request. In general, this module facilitates the exchange of information regarding the technology needs of a requestor as well as contact information for the requester. As such, the Requested Technology Module permits the requestor to access an external informational source for information not contained within the host system. This feature is beneficial to requestors and purveyors alike and represents a significant improvement over conventional information or product exchanges.

The Industry Services Module operates in a manner similar to the Available Technology and Requested Technology Modules but focuses on service related information sources such as Academic Organizations, Contractors, Consultants, Associations, Conferences and Exhibitions, Regulatory Agencies, and Standards Organizations. While the Industry Services Module is represented herein as being separate from the Available and Requested Technology Modules, these modules may be combined in the host system.

The Production Data Module provides the requester with information regarding past production levels, current production levels, and forecasted production levels of potential customers, competitors and suppliers. As is discussed in greater detail below, the Production Data Module preferably accesses and searches dedicated content provider servers (such as consultants, industry experts, and other content providers) through conventional plug-in technology and/or searches information stored in the data structure of the host system 12. Accordingly, the requestor may again access external information sources using this module to obtain relevant data. The production information accessible through this module may be sorted by manufacturer, platform, region and/or technology to provide usability and provides the requestor with information critical to fully understanding the market and demand for its technology.

The Published Media Module permits the requestor or user to access published information such as press releases, news stories, person or organization profiles, technical articles, market trend & analysis reports or other industry related publications and reports. The published information may be stored in a dedicated array of the data structure via web site extraction or other population techniques. Alternatively, in a manner similar to the Production Data Module, the requestor has the option of accessing external informational sources via web links and server plug-ins. Further, as is described in greater detail below, the data structure may include a library of available plug-in services from which the user may customize a published media search list of free or fee-based services. The host system 12 is configured to sort the information obtained from any of the sources based on requestor needs, such as by manufacturer, organization, technology, program, person, tier level or general category.

It should be appreciated that while these modules are described herein as being integrated into the host system 12, the system may include any one, or number of, the modules either alone or in combination. Further, it is noted that unlike conventional information exchanges, the Requested Technology, Industry Services, Production Data, and Published Media Modules each provide access to external informational sources by which a requestor may seek information not stored within the host server 12. This feature allows the requestors to further explore the availability of suitable technology (including products and services) through purveyor inquiries and information maintained by industry experts, consultants, and the like.

As shown in FIGS. 2-5, the requestor may access selected application modules at various stages. For example, as shown in FIG. 2, when a requestor logs onto the host system, the requestor is permitted to access any one of the modules through a conventional message prompt or menu 50. Alternatively, as is described below, the requestor may be prompted to initiate a new or revised search in an application module after completing a previous module. Each of the application modules are responsive to information provided by the requestor via a Technology Search Request or similar inquiry. As used herein, the term Technology Search Request includes requests for product, service, process, or general technology/industry information. While the manner of obtaining, and the substance of, the Technology Search Request may vary, the host server is configured to prompt the requestor to input technology information and parametric search data that corresponds to, or is searchable in, the data fields and entries in the data structure 30 (Step 52). Search requests may be provided by way of inputting the information in a free field format or through the use of a pull-down menu. The Technology Search Request may have a form capable of use in more than one application module (e.g., Available Technology and Requested Technology) or may have a module specific format. By way of example rather than limitation, a requester seeking Available Technology information regarding microcontrollers would manually type the word 'microcontroller' into a 'Technology' text-entry window or highlight/select a predefined 'microcontroller' selection from a menu. After, or in conjunction with, the display or entry of the technology information, the host server would prompt the requestor to enter parametric data. As used herein, the term parametric data includes search parameters descriptive of the technology of interest to the requestor and usable by the search engine 22 to identify matching or relevant technology. In the embodiment specifically illustrated herein, the server is configured to provide a list of parametric fields associated with technology information stored in the data structure. In the controller example, the server may display preselected parametric data-entry fields which are associated with microcontrollers and for which data fields are contained in the data structure. The parametric data-entry fields associated with microcontrollers may include 'A to D', 'Memory Capacity & Type (Ram, Rom, OTP & Flash)', 'Clock Speed/Frequency', 'Communications/Interfaces', 'Temperature Range', 'Timers', 'Operating Voltage' and 'Package Type'.

Figure 3:
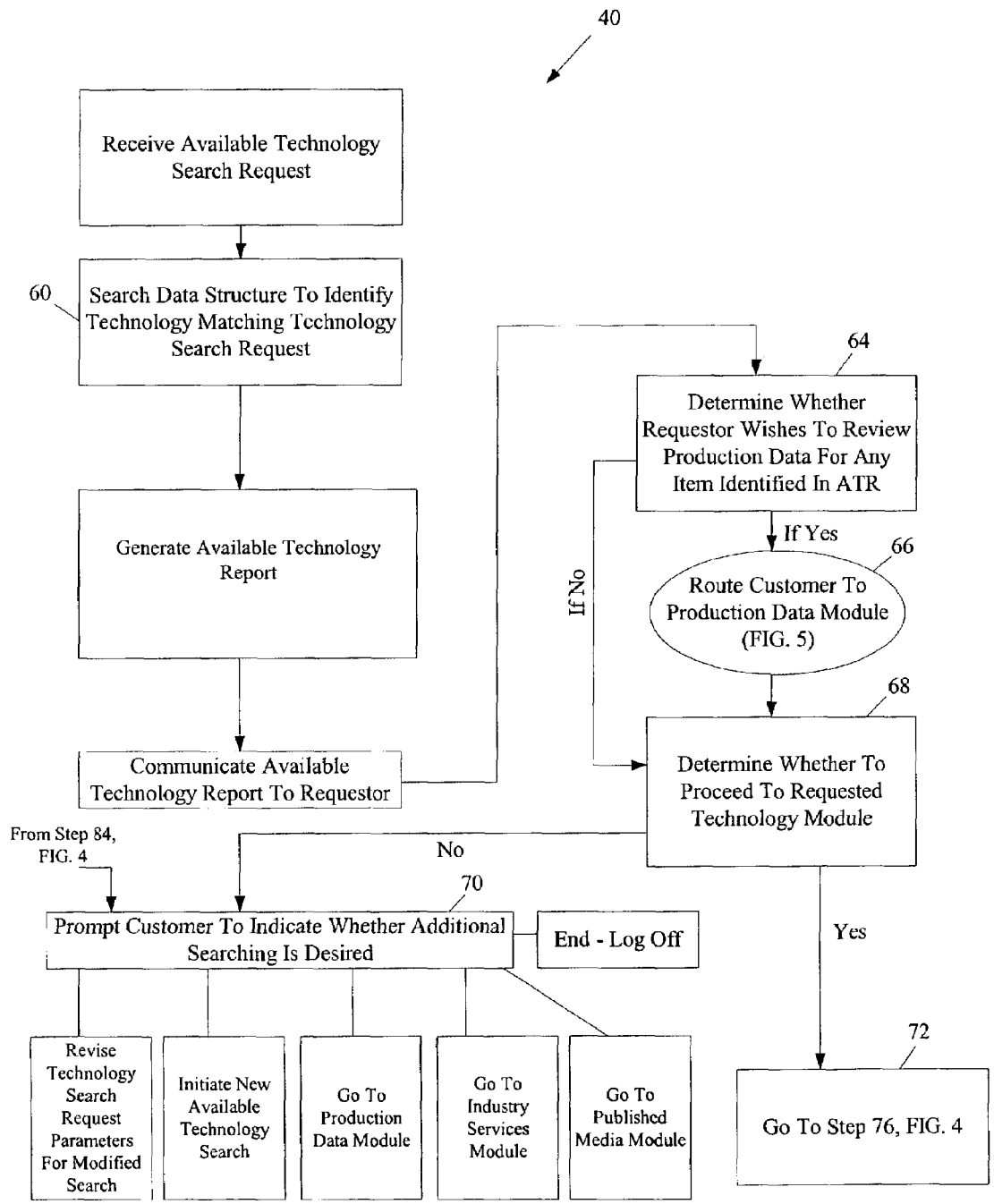
FIG. 3 is a flow chart illustrating the operation of the Available Technology Module shown in FIG. 2.

Turning now to the Available Technology Module 40 illustrated in FIG. 3. After the requester chooses to enter the Available Technology Module (Step 50, FIG. 2) and submits a Technology Search Request (Step 52, FIG. 2), the server stores the request (Step 54, FIG. 2) and proceeds to Step 60 in FIG. 3 to search the data structure, e.g., technology database 32, to identify data entries that satisfy or closely match the substance of the request. As used herein, the term "closely match" is intended to encompass conventional parametric searching techniques wherein a search request parametric is used as a search term to identify identical or synonymous terminology contained in data entries or documents in order to identify information that may be pertinent to the parametric. Any number of conventional search engines and techniques may be used to perform the data structure search. By way of example, it is contemplated that the data structure 30 may include a number of categories or data fields containing data entry information searchable using the requestor provided parametric. The determination of whether a specific data entry is "closely matching" may include evaluation of the number of data fields in which the data entry has the same or similar term as the parametric as well as a weighing of the importance of each of the data fields.

As is represented by Step 62 (FIG. 3), the application server 16 generates an Available Technology Report based on the search. The report is preferably, though not necessarily, sorted in rank order based upon the parametric match (e.g., the product, service, or other search term) followed by production history or readiness. A representative Available Technology Report is in the form of a table identifying purveyor information (name and contact data), product type (e.g., microcontroller), product designation (model or order number), production status (e.g., not available, currently unavailable, or anticipated date of availability), certifications, and sample availability. Products from different purveyors having the same production readiness are rank ordered alphabetically by purveyor's name. The requestor may use the Available Technology Report to evaluate the purveyor's products and services and/or contact selected purveyors.

The Available Technology Module may provide additional product or service information stored in the data structure 30. For example, in the case of products that are tailored for use in the automotive industry, the Available Technology Report includes information regarding the production status of the product (available both generally and/or for a particular industry), whether and what type of qualification certifications have been obtained, sample availability, and contact information. By the Available Technology Report, the system and method of the present invention provides the requestor with information to evaluate the suitability of the identified products or services for use in a particular application and/or industry. In the continuing example of a microcontroller for the automotive industry, the Available Technology Report may include the following information:

Product in Production—Yes or No
Product in Production for Automotive Application—Yes or No
Product and/or Processes Qualified for Automotive Application—Yes or No. If Yes, specific industry related qualifications achieved (e.g. for automotive electronics applications—ISO, QS9000, Q101, etc.)
Planned Date for Automotive Application Production—Month/Year or Not Available
Sample Availability—Currently Available or Month/Year
Contact information for purveyor of technology (e.g., name of contact person, URL, website, email address, telephone number, and/or post office address).

While the contact information may be listed in any manner suitable to convey the information or as requested by the purveyor, it is anticipated that contact information may include listings by single point contact, regionally, or by which company is requesting the technology.

As noted above, the system and method of the present invention provides the requestor with access to other application modules where appropriate. Step 64 in FIG. 3 illustrates an instance wherein the requestor is prompted to indicate whether the requestor wishes to review production data for any item identified in the Available Technology Report that is currently available for production. That is, for example, if 'Yes' is indicated in the Automotive Production (or customer's specific industry) field or there is a Planned Date for Automotive Application (or customer's specific industry) Production, a prompt or "click-access" may be provided to permit the requestor to review production information. Alternatively, as shown in FIG. 3, the system may prompt the requester to indicate whether access to Production Data Module (Step 66) is desired. Following completion of the production information option, a prompt from the server asks whether the requestor wishes to be linked to the Requested Technology Module (Step 68) or conduct additional searching (Step 70) such as in the Published Media or the Industry Services Modules. The steps may be performed with a single prompt or through a series of prompts as indicated in FIG. 3.

The Available Technology Module permits the requester can rapidly identify technologies which meet specific application needs including functionality as well as product and process qualification. Further, the requestor can identify which Available Technology information meets the specific production readiness needs of the application. Manufacturers can rapidly benchmark the competition by accessing parametric details and production readiness status of competitors' products. With rapid access to Available Technology information which meets the requestor's parametric and timing needs, the capital resources and human resources currently expended to gather this information can be significantly reduced. Technology options for the application, as well as production readiness availability, may be identified thus enabling an expedited market launch of the requestor's product incorporating the best-suited technology for the application.

A further feature of the information system 10 is the Requested Technology Module 42 which is particularly useful when the requestor is searching for a technology which has not been promoted in the public domain. For example, when the development and/or proprietary status of the technology has led to a lack of publication or the purveyor of the technology has not developed or targeted the technology for application in the industry of interest to the requestor. The Requested Technology Module also enables purveyors to be informed of potential customers for the purveyor's product or services. While the Available Technology Module searches the data structure 30 in order to return product specific information to the requester, the Requested Technology Module searches the data structure to identify purveyors that may be able to provide the product, service, or relevant information to the requester. The Requested Technology Module then permits the requestor to authorize the system to notify selected purveyors of the requestor's needs in order to facilitate further exchange of information. Accordingly, the Requested Technology Module permits the requestor to access external information (such as through contacting purveyors for further information) providing an avenue to further investigate suitable technology leads.

Figure 4:
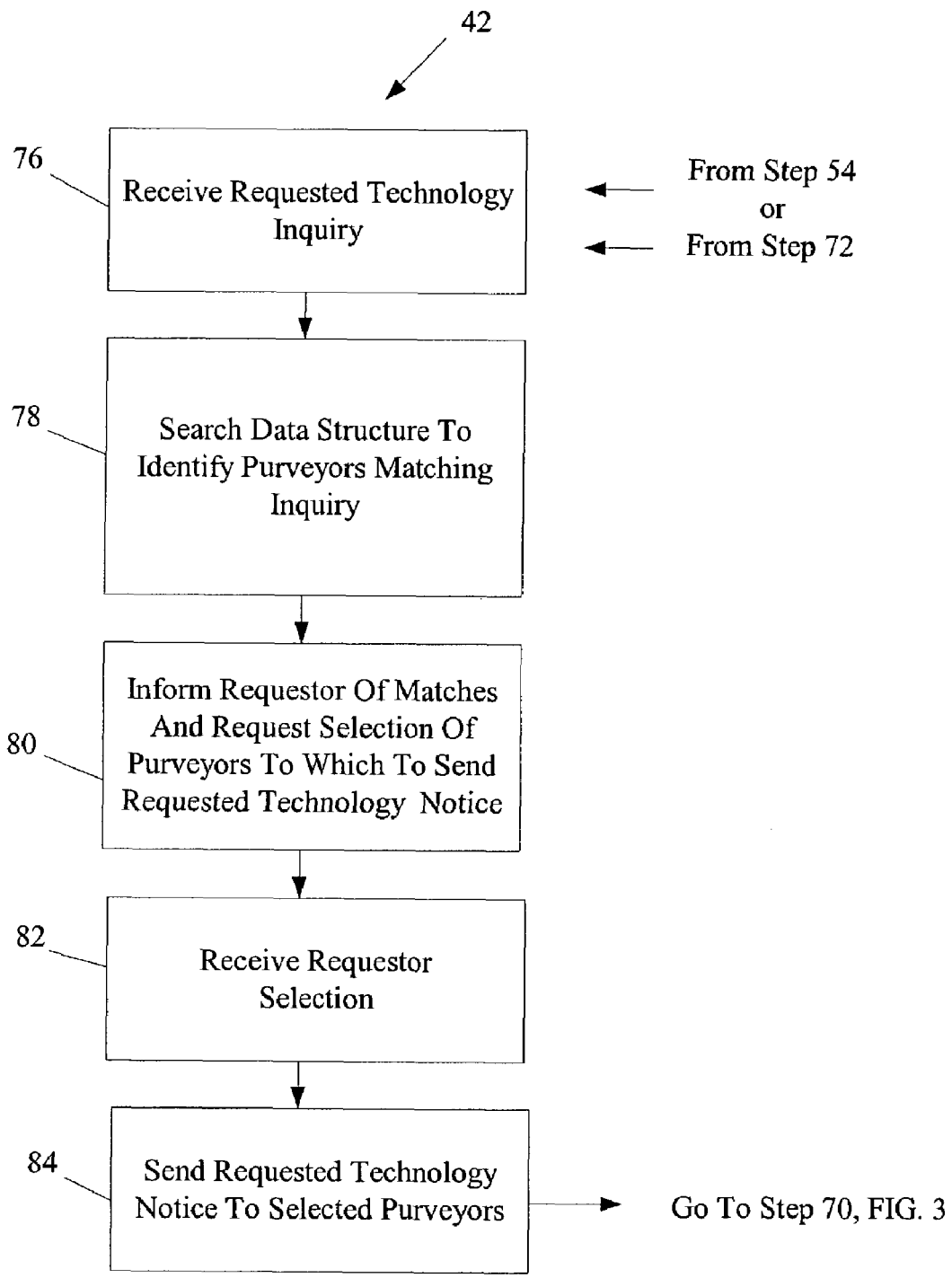
FIG. 4 is a flow chart illustrating the operation of the Requested Technology Module shown in FIG. 2.
Figure 5:
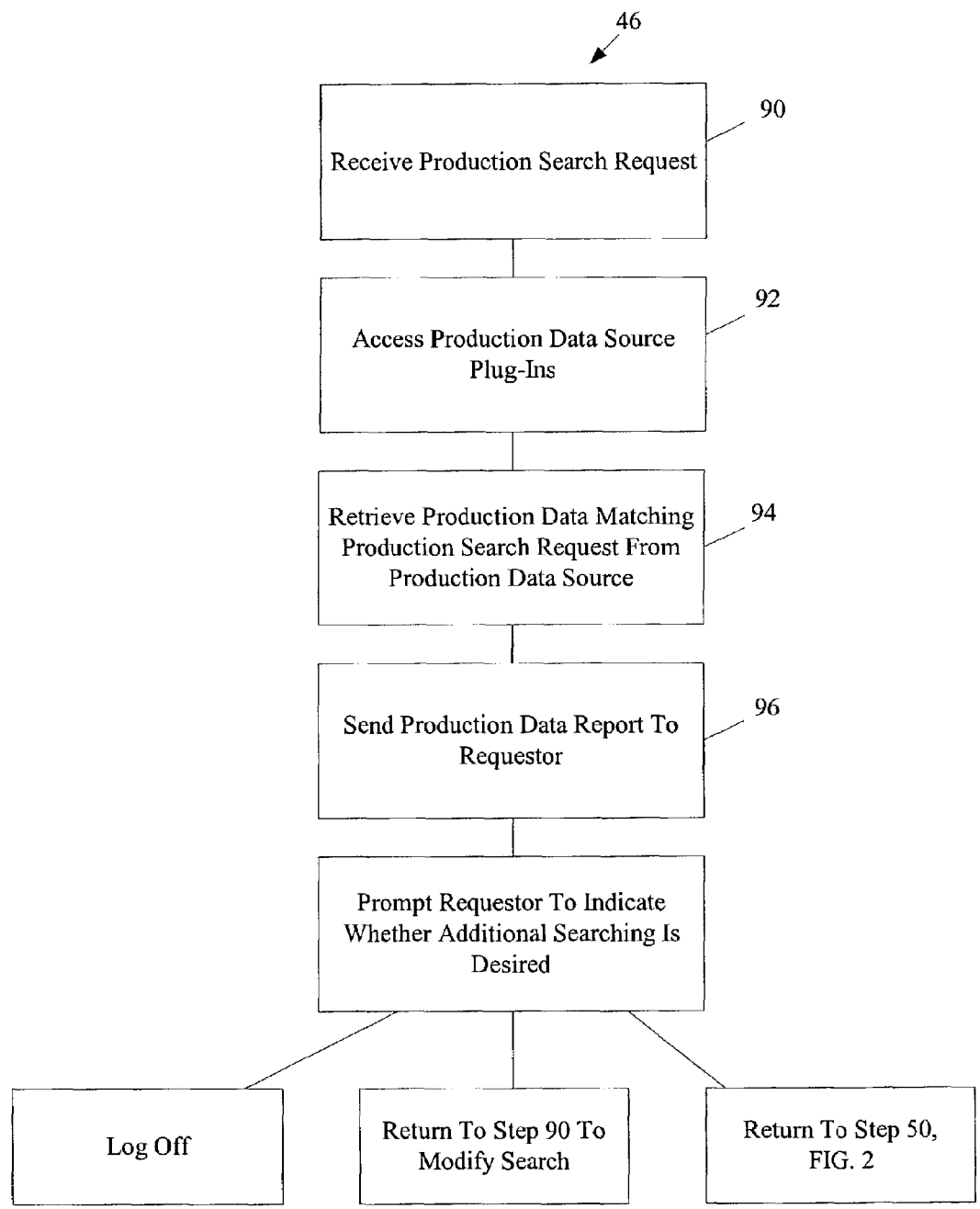
FIG. 5 is a flow chart illustrating the operation of the Production Data Module shown in FIG. 2.

As is shown in FIG. 4, the Requested Technology Module may be accessed directly from the select search module prompt (Step 50, FIG. 2) or after completing an Available Technology search (Step 72, FIG. 3). As shown in Step 76 of FIG. 4, the Requested Technology Module is initiated through submission of a Requested Technology Inquiry from the requester. This Inquiry may be based on the Technology Search Request used in the Available Technology Module or may be separately entered or submitted by the requestor, such as through entering relevant data in a menu prompt or other suitable means. The Requested Technology Inquiry preferably includes industry information and product or service information, such as parametric data pertaining to the requested technology.

The form of the prompt and data entry may vary. For example, in the continuing automotive example, the system is configured to utilize the information entered by the requestor's search in the Available Technology Module and load this data directly in to the Requested Technology Module to perform the search. Alternatively, the requestor may start the search from the Requested Technology Module, requiring the requestor to either manually type the word "microcontroller" into a 'Requested Technology Inquiry' text-entry window or highlight/select a predefined 'microcontroller' selection from a menu and then enter key parametric data as described above. Based upon the key parametric data, the search engine 22 identifies data entries in the data structure, e.g., technology database 32, containing the purveyor(s) and technology(ies) that most closely match the inquiry based on predetermined parameters such as product, process, design, and/or production competencies (Step 78, FIG. 4).

In Step 80, the host server 14 informs the requestor of matches and requests selection of purveyors to which the requestor wishes to send a Requested Technology Notice. The request may be made by a screen prompt asking the requestor if they would like the Notice to be sent to one or more of the matching purveyors. If the requestor replies "Yes", an additional prompt asks the requestor to identify which of the purveyors to send the Notice. The requestor then has the option to send the Notice to all matching purveyors or to specific selected purveyors. After the requestor selects the purveyors to which the Notice is to be sent (Step 82), the host server sends (such as via email) the Requested Technology Notice to the appropriate contacts at the purveyor organizations (Step 82). The system may then return the requestor to Step 70 in FIG. 3 or otherwise prompts the requestor to indicate whether additional searching is desired.

As is discussed above, the search for purveyors that closely match the Requested Technology Inquiry is performed using the information in the data structure. A single data structure may be accessed for both the Available and Requested Technology Searches or may be separated into dedicated databases for each module. In either instance, information in the data structure for the Requested or Available Technology Searches may be loaded and updated by purveyors.

The current approach for purveyors to identify requestors or potential customers of their technology utilizes expensive, lengthy, and labor intensive methods. These methods include extensive research to identify target companies and the appropriate individuals in these target companies who might be potential users or requestors for the specific technology. This approach is ineffective as the purveyor of the best-suited technology for the application identifies many of the requestors either too late or never.

In contrast, the Requested Technology Module of the invention provides an efficient means for requestors to identify technology which is difficult to locate in the public domain and enables purveyors to rapidly identify potential customers for their technology. This feature significantly reduces the infrastructure and associated costs currently necessary to identify new business opportunities. Further, the ability to rapidly identify various types of requested technology better serves product planning processes as constantly updated requested technology tables, capable of being sorted by parametric and other data, provide insight into the present and future needs and wants of customers.

The Industry Services Module 44 enables the requestor to send a request for a specific service to the service suppliers stored in the data structure. Similar to Requested Technology feature, discussed previously, a 'Requested Service Notice' is directed to the service suppliers closely matching the requestor's specific needs and includes the parameters of the specific service as well as the requestor's contact information. It is contemplated that service information stored in the data structure 30, particularly the technology database 32 which may be used by the Industry Services Module, may be acquired from numerous sources such as academic organizations, contractors, associations, conferences and exhibitions, regulatory agencies, and standards organizations. In general, the Industry Services Module provides access to information relating to individuals and organizations having expertise or responsibilities within industries of interest and capabilities for providing consulting services and the like. Support organizations such as those discussed above are fruitful sources of knowledge, information, or general guidance that may be critical to industry participants. The following are illustrative examples of the data fields and type of information that may be searchably stored in the data structure for each of the Industry Services purveyors.

'Academic'—research and development projects and focus (e.g. micro-machined silicon, 42 Volt architecture, electronic valve control, etc.).

'Contractor'—(e.g. design, manufacture, consultants, etc.).

'Associations'—(e.g. engineering, manufacturing, etc.).

'Conferences & Exhibitions'—(e.g. vehicle manufacturers, tier one suppliers, tier two suppliers, electronics, interiors, and time, location, conference or exhibition participants, focus, and agenda).

'Regulatory & Standards Organizations'—(e.g. environmental, multiplexing, and information about charter or focus of organization)

'Contact information'—contact information for the organization and/or personnel within the organization Just as with the Available Technology and Requested Technology Modules, the information for these organizations would be stored in the data structure, loaded and updated via web-based data extraction, by other available media containing the information, and/or by each of the subscriber organizations. The information in the database would again be sorted into fields suitable for searching and the service search request would be formatted to facilitate identification of closely matching organizations by the search engine.

As is described above, the Available Technology, Requested Technology, and Industry Services Modules are each configured to access and search information stored in the host system 12, particularly the data structure 30. Before describing the operation of the Production Data and Published Media Modules, it is noted that these modules preferably use a plug-in server to access information external to the host system 12. As will be appreciated by those skilled in the art, the plug-in server may be embedded within the application server 16, or one of the other servers illustrated in FIG. 1, or may be a separate server within the system. The plug-in server and/or search engine 22 communicate with the Published Media Storage and/or Production Data Storage sections of the data structure 30 which maintain a library of available external sources. The host system 12 maintains a source list for each registered requestor or user which is a subset of the available sources maintained in the library. In at least the case of Production Module and the Published Media Module, the sources may be free or fee-based services. In the illustrated embodiment, a separate library of Production Data sources and Published Media sources are separately maintained within the system. As will be described in detail below, requestors are provided with the opportunity to customize their individual source list including being able to subscribe to fee-based services.

Turning now to the Production Data Module 44, this feature provides the requestor with an opportunity to access data relating to the production status of a particular product, volume information, platform forecasting where the product or service may be applicable, and/or price data. End item manufacturers, intermediate tier level suppliers, service suppliers, and other participants in an industry rely upon production information and forecasts to determine the market for a particular product or service. Gathering this information currently involves utilizing numerous information sources, many of which provide incomplete and/or inaccurate information, and is therefore ineffective and inefficient. In the present invention, the Production Data Module permits requestors to access production information through plug-ins to dedicated information provider sources. The sources may include industry analysts, consultants, and periodical providers as well as manufacturers of products. Thus, the Production Data Module provides an accurate, comprehensive, and accessible single source of production and forecast information for industry stakeholders.

The available sources and plug-in information is maintained in the host system 12, such as the production data storage array 38 of the data structure 30. A customized list of production data sources may be maintained for each registered user such as in the customer data structure 36. In operation, the Production Data Module (FIG. 5) receives a production search request from the requestor (Step 90). While the form or format of the production search request may vary, it is contemplated that the request will designate the industry within which the requestor seeks information as well as parametrics relating to one or more of: time frame, manufacturing company, global region of manufacturer's headquarters, country of manufacturer's headquarters, global region of production, country of production, manufacturing plant location(s), platform designation, end item categories, product application, past, present & forecasted annual volumes and pricing. The host system 12, such as via the application server and search engine, accesses the production data source plug-ins maintained in the data server 20 and links with the identified production data sources via a plug-in. The system then retrieves production data matching the production search request from the production data sources (Step 94). The host system then generates and sends a Production Data Report to the requestor (Step 96). The form and format of the Production Data Report may vary but preferably includes one or more of the above discussed request parametrics and spans a suitable time interval.

An example of suitable data entry fields and parametric data for a search in the Automotive Industry may include:
1. 'Time Frame' (e.g. requestor enters '2000 through 2012'),
2. 'Manufacturer' (e.g. requestor leaves this window blank),
3. Country of Manufacturer's Headquarters (e.g. requestor enters 'Japan'),
4. 'Region of Manufacturer's Headquarters' (e.g. requestor leaves this window blank),
5. 'Region of production' (e.g. requestor selects 'All.'),
6. 'Country of Production' (e.g. requestor leaves this window blank),
7. 'Manufacturing Plant Location' (e.g. requestor leaves this window blank),
8. 'Vehicle platform' (e.g. requestor leaves this window blank), and
9. 'Vehicle Category' (e.g. requester enters 'Sport Utility').

The data structure 30, and particularly the production data storage array 38, may be configured to store production data in a searchable fashion similar to the Available and Requested Technology Modules for generating production data reports in response to search requests. The data structure may be populated through the population server 18 or other conventional techniques with the production data sorted in predetermined fields. Production Data stored in data storage 38 may be periodically updated by manufacturers such as through password-protected account access. By way of example, each data entry preferably designates whether the manufacturer is an end item manufacturer (e.g., vehicle manufacturers for the automotive industry) or an intermediate tier level supplier (e.g., tier one or tier two supplier). Each data entry also preferably designates the industry within which the manufacturer operates and the products produced by the manufacturer may be used. The data entries may further include sortable fields relating to a predetermined time frame such as data from two years prior, current year-to-date data, a production forecast for the remainder of current year, and/or a production forecast for the next nine years. Production forecasts may be tabulated from information supplied by the manufacturer (typically platforms announced by vehicle manufacturer) and programs sourced to other suppliers. For forecast periods where specific platform, product, and application information are unavailable from the manufacturer, the information may be tabulated from industry analyst input of from searches of plug-in sources such as is described above.

In the continuing automotive industry application example, the Production Data Report would indicate the total annual production of all sport utility vehicles produced by Japanese vehicle manufacturers for the years 2001, 2002, year-to-date for 2003, and the forecast for these vehicles for the balance of 2003 through 2013. In addition to the volume information, pricing information may also be accessible from the Production Data Module.

The Production Data Module, used alone or in combination with other application modules, advantageously supplies the requestor with access to a single information source having comprehensive production and forecast data so as to eliminate the additional time, resources, and costs associated with obtaining the data through the numerous information sources that currently hold the data. The feature also eliminates the costs associated with the slower channels of obtaining the information, i.e., conversations, interviews, etc. Further, the improved accuracy, comprehensiveness and rapid access of this information saves industry participants time and money as capacity planning, time to market, and product planning strategies may be made more quickly and accurately.

The information system 10 also preferably includes a Published Media Module providing access to information sources such as trade journals, technical periodicals, web sites, and other information services. The Published Media Module is again an example of the system providing the requestor with access to information outside of the information stored in the host system. In this module, the system may search internally stored data, such as in the Published Media storage array 34, as well as provide plug-in access to published media websites or dedicated provider sources.

Figure 6:
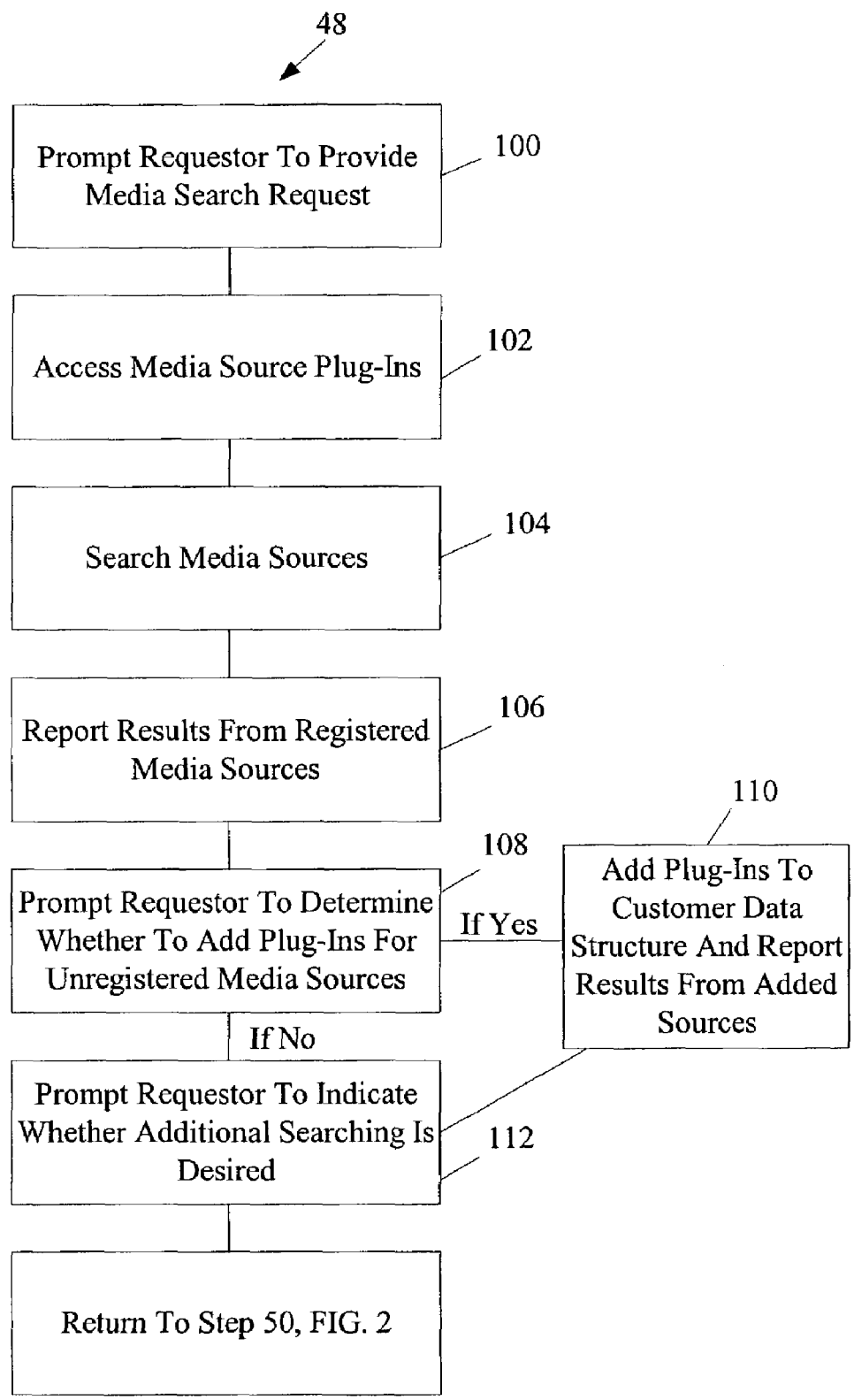
FIG. 6 is a flow chart illustrating the operation of the Published Media Module shown in FIG. 2.

As shown in FIG. 6, the Published Media Module initially prompts the requestor to provide a media search request (Step 100). In a manner similar to the previously described modules, the media search request may be in a variety of forms and formats, including a prompt menu with predetermined parametric search terms or categories. By way of example, the data fields and parametric data may generally be directed to: 'Time Frame' (MM/DD/YR to MM/DD/YR), 'Technology', 'Company or Organization', OEM/End Item Manufacturer level (e.g., OEM/End Item 'Vehicle Manufacturers' as well as Tier One and Tier Two Manufacturers for the Automotive industry), 'General Industry', 'Regional', 'Person'. The requestor would enter data in all or any combination of these parameters to access the specific published media in the storage array 34 and/or through plug-in links to specific documents. In the latter case, after entry of the media search request, the system accesses the media sources via plug-ins (Step 102). After searching the media sources and reporting the results therefrom (Steps 104 and 106) the Published Media Module prompts the requestor to determine whether the requestor wishes to add plug-ins for unregistered media sources. It is anticipated that the host system will maintain a list of media sources available to all requesters as well as a customized list for each registered user identifying which of the available sources are included in the user's customized list. The system may be configured to search only sources in the user's list or may search all sources and provide abstracts or summaries of unregistered sources to the user. The user can then elect, such as in Step 108, to add previously unregistered sources to its customized library. If the requestor elects to add one or more of the unregistered media sources, the system adds the source to the customized registered list at Step 110 and prompts the requestor to indicate whether additional searching is desired (Step 112).

As noted above, the Published Media Module may also be configured to search a database of published material maintained by the host system. This search would be performed by the search engine in a conventional manner.

From the above description, it should be appreciated that the Published Media Module is configured to access a customized list of on-line or system stored published media data thereby providing the user with the ability to select sources that are most relevant to the user's market and industry. The ability to add or delete sources from the customized library or listing provides further flexibility for tailoring the system to the changing needs of the users. It is contemplated that the report provided to the user would include capabilities to scan, sort, and access additional published media information. By way of illustration, the data structure 30 is preferably configured to maintain a library of available external informational sources from which each requester may create a customized list of registered external informational sources. It is further contemplated that when the requestor selects its customized list, the host system may prompt the requestor to identify external informational sources that are not included in the library of available external informational sources but that the requestor may like to include in published media or other external searches described herein. If, in response, the requestor identifies such an additional source, the manager of the host system may investigate the suitability and availability of the additional source and, if desired, add the source to the library of available external informational sources.

The Published Media feature has many advantages. As mentioned above, technical articles, press releases, general industry articles, company and personal profiles and announcements are generated by numerous organizations, information and consulting services, and industry publications. The advantage of an industry specific, integrated search engine, configured specifically for the user's needs, to locate published media would reduce time, effort and associated costs to obtain the media. Searching through the combination of website, web link and on line services affords the user access to a comprehensive tool for rapid access of published media information.

The present invention also includes a selective filtering feature which allows a user to limit access to information, such as Available Technology Information, Requested Technology Information, Production Data, etc., which the user has input into the system database or is accessed through external plug-ins. For example, a vehicle manufacture may input Production Data into the system data structure and then use the selective filtering feature to limit access to such Production Data to only specific registered users. The selective filtering feature may be based on a conventional algorithm which requires a code or password to gain access to the database, specific portions of the data structure (e.g. Available Technology Information, Requested Technology Information, etc.), and/or some or all information input by a specific user or the selective filtering feature may be based on other similar types of known computer information protection systems.

The foregoing discussion discloses and describes an exemplary embodiment of the present invention. One skilled in the art will readily recognize from such discussion, and from the accompanying drawings and claims, that various changes, modifications and variations can be made therein without departing from the true spirit and fair scope of the invention as defined by the following claims.

What is claimed is:

1. A method of disseminating technology information between requestor servers and purveyor servers using a host computer system having a data structure, a search engine communicating with the data structure, and an application server communicating with the data structure and search engine, the data structure including one or more of a first data array, a second data array, and a third data array, the first data array containing a plurality of data entries each with technology and purveyor data, the second data array containing links to a plurality of available external informational sources, and the third data array containing requestor data including requestor registered external informational sources, said requestor registered external informational sources being a subset of the available external informational sources, said method comprising the steps of:

providing the requestor with the option of conducting an available technology search to identify closely matching data entries in the data structure or an external informational search including one or more of a requested technology search, published media search, and a production data search, wherein the published media search report includes a copy of each of the identified published media documents from the requestor registered external informational sources;

receiving a search request from the requestor server, the search request including a technology parametric;

identifying data entries having technology data closely matching the technology parametric;

accessing purveyor data associated with one or more of the identified data entries; and sending a search request notice to one or more of the identified purveyors using the purveyor data;

providing the requestor with information on the available external informational sources containing an identified published media document that are not included in the requestor registered external informational sources; and permitting the requestor to add available external informational sources to the requestor registered external informational sources, wherein upon requestor selection of a published media search, the method further includes the steps of:

receiving a search request from the requestor server, the search request including a technology parametric;

conducting a parametric search in each of the available external informational sources to identify published media documents having information pertaining to the technology parametric; and communicating a published media search report to the requestor.

2. The method of claim 1 further including sending a search report to the requestor server and a request for the requestor to select one or more of the identified purveyors, receiving selection information from the requestor server selecting one or more of the identified purveyors, and sending the search request notice to only the selected purveyors.

3. The method of claim 1 further including prompting the requestor to create the requestor registered external informational sources by selecting from the stored list of available external informational sources and storing the requestor registered external informational sources in the data structure.

4. The method of claim 3 further including prompting the requestor to identify additional sources not included in the available external informational sources and selectively adding an additional source to the available external informational sources.

5. A method of disseminating technology information between requestor servers and purveyor servers using a host computer system having a data structure, a search engine communicating with the data structure, and an application server communicating with the data structure and search engine, the data structure including one or more of a first data array, a second data array, and a third data array, the first data array containing a plurality of data entries each with technology and purveyor data, the second data array containing links to a plurality of available external informational sources, and the third data array containing requestor data including requestor registered external informational sources, said requestor registered external informational sources being a subset of the available external informational sources, said method comprising the steps of:

providing the requestor with the option of conducting an available technology search to identify closely matching data entries in the data structure or an external informational search including one or more of a requested technology search, published media search, and a production data search, wherein the published media search report includes a copy of each of the identified published media documents from the requestor registered external informational sources;

receiving a search request from the requestor server, the search request including a technology parametric;

identifying data entries having technology data closely matching the technology parametric;

accessing purveyor data associated with one or more of the identified data entries;

sending a search request notice to one or more of the identified purveyors using the purveyor data;

determining whether the requestor wishes to conduct a published media search in any of the available external informational sources not included in the requestor registered external informational sources; and permitting the requestor to add available external informational sources to the requestor registered external informational sources, wherein, upon the requestor selection of a published media search, the method further includes the steps of:

conducting a parametric search in each of the requestor registered external informational sources to identify published media documents having information pertaining to the technology parametric; and communicating a published media search report to the requestor.

6. The method of claim 5 wherein upon the requestor selection of a production data search, the method further includes the steps of:

conducting a parametric search in one or more of the available external informational sources to identify production data having information pertaining to the technology parametric; and communicating a production data search report to the requestor.

7. The method of claim 5 further including the step of performing an available technology search prior to providing the requestor with the option of conducting an external informational search and wherein the performance of an available technology search includes receiving a search request from the requestor, the search request including a technology parametric, searching the first data array to identify data entries having technology data closely matching the technology parametric, and sending an available technology search report to the requestor.

* * * * *